(12) United States Patent  
Bonaccio et al.

(10) Patent No.: US 8,791,726 B2
(45) Date of Patent: Jul. 29, 2014

(54) CONTROLLED RESONANT POWER TRANSFER

(71) Applicant: International Business Machines Corporation, Armonk, NY (US)

(72) Inventors: Anthony R. Bonaccio, Shelburne, VT (US); Jingdong Deng, Essex Junction, VT (US); Zhenrong Jin, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/733,494

(22) Filed: Jan. 3, 2013

(65) Prior Publication Data

US 2014/0184295 A1    Jul. 3, 2014

(51) Int. Cl.
    H03K 3/00    (2006.01)
(52) U.S. Cl.
    USPC .......... 327/109; 327/110; 327/111; 331/117 R
(58) Field of Classification Search
    USPC ................ 327/109–111; 326/87–88, 91–92; 323/271, 272, 290; 331/181, 117 R
    See application file for complete search history.

(56) References Cited

U.S. PATENT DOCUMENTS

| | | | |
|---|---|---|---|
| 4,413,313 A | | 11/1983 | Robinson |
| 4,833,584 A | * | 5/1989 | Divan ............................. 363/37 |
| 4,931,716 A | * | 6/1990 | Jovanovic et al. ............ 323/285 |
| 5,126,589 A | | 6/1992 | Renger |
| 5,508,639 A | * | 4/1996 | Fattaruso ........................ 326/97 |
| 5,594,635 A | * | 1/1997 | Gegner .......................... 363/124 |
| 6,882,182 B1 | | 4/2005 | Conn et al. |
| 7,082,580 B2 | | 7/2006 | Zarkesh-Ha et al. |
| 7,145,408 B2 | | 12/2006 | Shepard et al. |
| 7,571,410 B2 | | 8/2009 | Restle |
| 7,719,317 B2 | | 5/2010 | Chueh et al. |
| 7,872,539 B1 | | 1/2011 | Athas |
| 7,973,565 B2 | * | 7/2011 | Ishii et al. ....................... 326/93 |
| 2004/0158758 A1 | | 8/2004 | Zarkesh-Ha et al. |
| 2011/0006850 A1 | | 1/2011 | Shibasaki et al. |
| 2011/0210761 A1 | | 9/2011 | Ishii et al. |

OTHER PUBLICATIONS

Chan et al, "A Resonant Global Clock Distribution for the Cell Broadband Engine Processor", IEEE Journal of Solid-State Circuits, vol. 44, Issue 1, Jan. 2009, pp. 64-72.

Sasaki, "A High Frequency Clock Distribution Network Using Inductively Loaded Standing-Wave Oscillators", IEEE Journal of Solid-State Circuits, vol. 44, Issue 10, Oct. 2009, pp. 2800-2807.

Chan et al., "A Resonant Global Clock Distribution for the Cell Broadband-Engine Processor", IEEE International Solid-State Circuits Conference, ISSCC 2008, Session 28, Non-Volatile Memory & Digital Clocking, Feb. 2008, pp. 512, 513 and 632.

Chan et al., "Resonant Global Clock-Distribution for the Cell Broadband-Engine Processor", IEEE International Solid-State Circuits Conference, 2008, 27 pages.

* cited by examiner

Primary Examiner — An Luu
(74) Attorney, Agent, or Firm — David Cain; Roberts Mlotkowski Safran & Cole, P.C.

(57) ABSTRACT

Recycling energy in a clock distribution network is provided. A circuit includes a clock driver associated with a clock signal and having an output connected to a first load capacitance. The circuit also includes a second load capacitance connected in parallel with the first load capacitance. The circuit further includes a power transfer circuit including an inductor and a transmission gate connected in series between the first load capacitance and the second load capacitance. The power transfer circuit controls a flow of energy between the first load capacitance and the second load capacitance based on the clock signal.

23 Claims, 6 Drawing Sheets

CONTROLLED RESONANT POWER TRANSFER

FIELD OF THE INVENTION

The invention relates to clock distribution in integrated circuits and, more particularly, to reducing the power consumed by a clock distribution system in an integrated circuit.

BACKGROUND

The power used to drive a clock distribution system in an integrated circuit chip represents a large portion of the total system power. Resonant clocking is a technique that may be used to reduce the power required to drive the clock distribution system, and thereby reduce the total system power, by recycling energy with a resonant clock network. Resonant clocking may be achieved using a coupled LC oscillator circuit in which an inductor (represented by inductance L) recycles power for use in clocking the driven circuit (represented by capacitance C). However, LC-based resonant clocking has the following shortcomings: it is limited to a narrow operating frequency range; it provides a slow slew rate of the clock waveform (e.g., a sine wave instead of a square wave); and it requires a large on-chip area to accommodate the inductor of the LC oscillator.

Accordingly, there exists a need in the art to overcome the deficiencies and limitations described hereinabove.

SUMMARY

In a first aspect of the invention, there is a circuit for recycling energy in a clock distribution network. The circuit includes a clock driver associated with a clock signal and having an output connected to a first load capacitance. The circuit also includes a second load capacitance connected in parallel with the first load capacitance. The circuit further includes a power transfer circuit comprising an inductor and a transmission gate connected in series between the first load capacitance and the second load capacitance. The power transfer circuit controls a flow of energy between the first load capacitance and the second load capacitance based on the clock signal.

In another aspect of the invention, there is a circuit for recycling energy in a clock distribution network. The circuit includes a first clock driver associated with a first clock signal, and a second clock driver associated with a second clock signal. The circuit also includes a first load capacitance comprising first elements that are driven by the first clock driver. The circuit further includes a second load capacitance comprising second elements that are driven by the second clock driver. The circuit additionally includes a power transfer circuit that transfers energy from the first load capacitance to the second load capacitance when the first clock signal is in a first state, and that transfers energy from the second load capacitance to the first load capacitance when the first clock signal is in a second state.

In another aspect of the invention, there is a method of recycling energy in a clock distribution network. The method includes providing a clock signal to a clock distribution network. The method also includes controlling a transfer of energy between a first load capacitance in the clock distribution network to a second load capacitance in the clock distribution network based on a state of the clock signal.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of a circuit for recycling energy in a clock distribution network which comprises the structures of the present invention. In still further embodiments, a method in a computer-aided design system is provided for generating a functional design model of the circuit for recycling energy in a clock distribution network. The method comprises generating a functional representation of the structural elements of the circuit for recycling energy in a clock distribution network.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to clock distribution in integrated circuits and, more particularly, to reducing the power consumed by a clock distribution system in an integrated circuit. According to aspects of the invention, power reduction in clocking is achieved by recycling power between two capacitance elements, rather than between a capacitance element and an inductor. In embodiments, switches and/or diodes are used in a power transfer circuit to control the timing and direction of energy transfer between the two capacitance elements, which permits the power transfer circuit to be used in wide band operation. In a particular embodiment, switches and diodes are used to control a power transfer between two differential clock phases in which the charges transfer between two clocks instead of being discharged directly to ground.

Implementations of the invention save power over a wide frequency range since the power transfer circuit is not controlled by the natural LC resonant frequency. Moreover, implementations of the invention produce square-like rail-to-rail digital pulses instead of sine waves. Implementations of the invention also utilize less chip area than LC-based resonant clock circuits since the inductance element used in the inventive power transfer circuit is smaller than the inductance element used in an LC-based resonant clock circuit due to there being no resonance requirement in embodiments of the invention.

Figure 1:
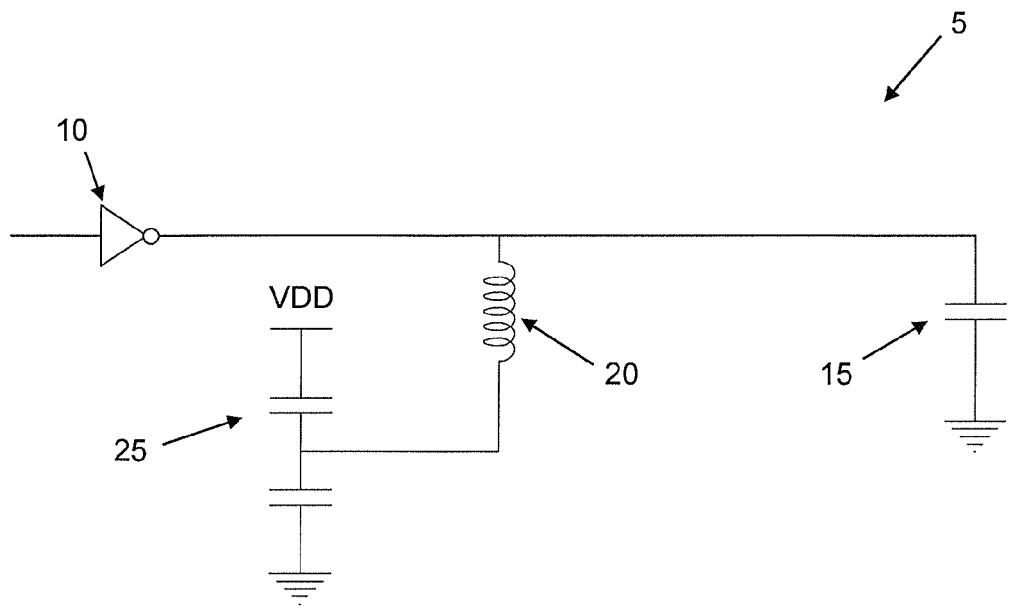
FIG. 1 shows a circuit diagram for a resonant clock distribution circuit.

FIG. 1 shows a circuit diagram for a resonant clock distribution circuit 5 that includes a clock driver 10, a load capacitance 15, an inductor 20, and a decoupling capacitor 25. The clock driver 10 is associated with a clock signal and provides a supply current (e.g., a clock driver current) to the devices represented by the load capacitance 15. The load capacitance 15 represents the total capacitance of all clocked devices coupled to the output of the clock driver 10, e.g., that are driven by the clock driver 10 in the clock distribution network. The inductor 20 is connected in parallel with the load capacitance 15 and is biased at one-half the supply voltage (e.g., VDD/2). The resonant frequency of the circuit 5 is a function of the value (L) of the inductor 20 and the value (C) of the load capacitance 15. In practice, the inductor 20 is sized such that the resonant frequency of the circuit 5 matches the clock frequency, in which case a resonance occurs where reactive power stored in the load capacitance 15 is transferred to the inductor 20 and recycled back to the load capacitance 15 on the next clock cycle. This recycling of power reduces the total power provided by the clock driver 10 to the load capacitance 15.

Still referring to FIG. 1, the clock driver 10 must be relatively weak compared to the load capacitance 15, e.g., fan-out>>10, in order to realize significant power savings. Moreover, the inductor 20 must be sufficiently large to store the power received from the load capacitance 15, and this relatively large size of the inductor 20 results in a large area penalty, e.g., increases chip size. Furthermore, the circuit 5 only provides power savings when the clock frequency matches or exceeds the resonant frequency of the LC system, which results in the circuit having a narrow band of operation.

Figure 2:
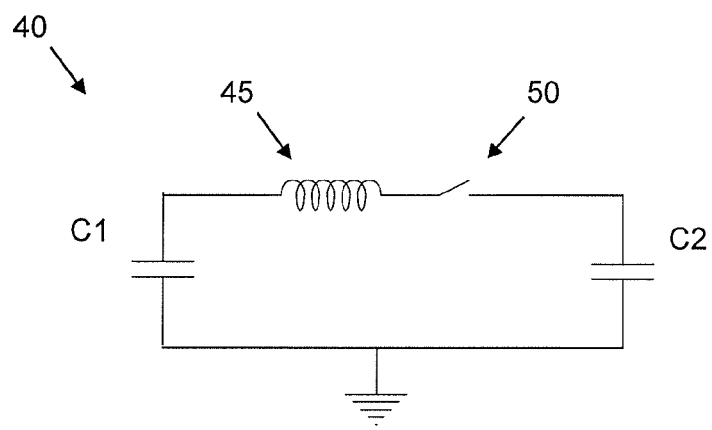
FIG. 2 shows a diagram of a circuit that provides inductor-assisted power transfer between two capacitors in accordance with aspects of the invention.

FIG. 2 shows a diagram of a circuit 40 that provides inductor-assisted power transfer between two capacitors in accordance with aspects of the invention. The circuit 40 includes an inductor 45 and a switch 50 (e.g., transmission gate) connected between two capacitors C1 and C2. In embodiments, reactive energy is transferred (e.g., recycled) between the two capacitors C1 and C2 via the inductor 45. The switch 50 may be used to control the timing and direction of the energy transfer between the capacitors C1 and C2, and the inductor 45 may be sized relatively small to assist fast energy transfer between the capacitors C1 and C2. In this manner, the circuit 40 may be used for recycling power between the two capacitors C1 and C2, in contrast to recycling power between a capacitor and an inductor as in a LC-based resonant clock circuit. The power transfer provided by the circuit 40 is not tied to a resonant frequency of an LC circuit and thus may be used for power recycling across a wider band of frequencies than a conventional LC-based resonant clock circuit.

Figure 3:
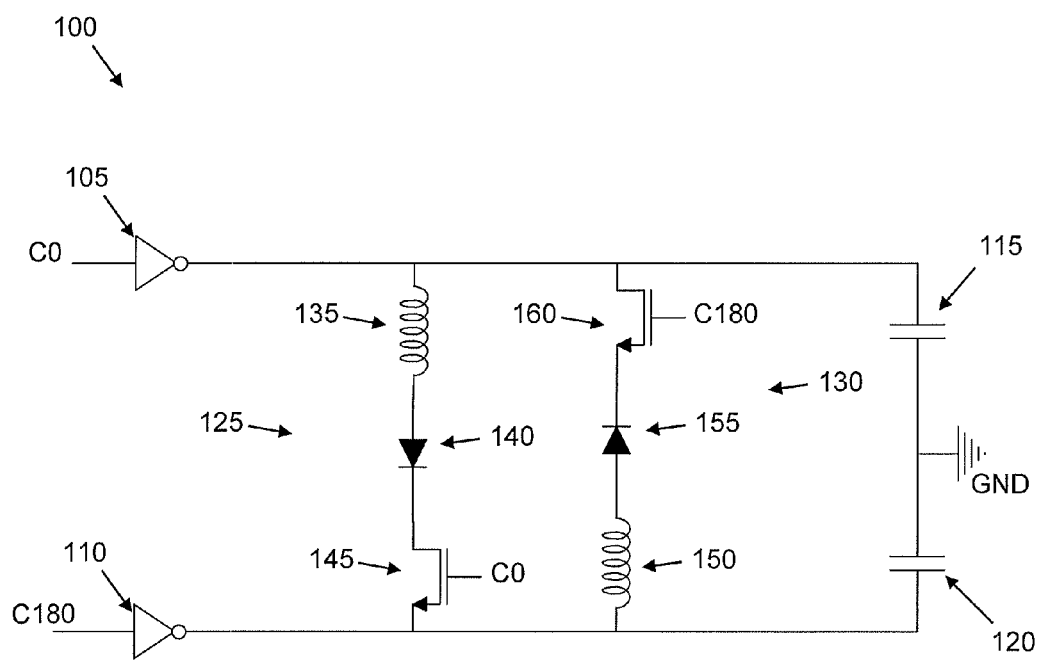
FIG. 3 shows a diagram of a circuit that provides resonant-power-transfer-assisted power reduction in differential clocking in accordance with aspects of the invention.

FIG. 3 shows a diagram of a circuit 100 that provides resonant-power-transfer-assisted power reduction in differential clocking according to aspects of the invention. In embodiments, the circuit 100 includes a first clock driver 105 (e.g., drive inverter) and a second clock driver 110 (e.g., driver inverter) that provide respective clock signals "C0" and "C180" that are 180° out of phase relative to one another. The circuit 100 also includes a first load capacitance 115 that represents devices (e.g., flip-flops, etc.) that are driven by the first clock driver 105, and a second load capacitance 120 that represents devices (e.g., flip-flops, etc.) that are driven by the second clock driver 110. The first clock driver 105 is associated with the first clock signal C0 and provides a supply current (e.g., a clock driver current) to the devices represented by the first load capacitance 115. The second clock driver 110 is associated with the second clock signal C180 and provides a supply current (e.g., a clock driver current) to the devices represented by the second load capacitance 120. In embodiments, the first load capacitance 115 and the second load capacitance 120 are arranged in parallel and connected to ground GND.

In accordance with aspects of the invention, a first transfer path 125 and a second transfer path 130 are connected between the first load capacitance 115 and the second load capacitance 120. In embodiments, the first transfer path 125 includes a first inductor 135, a first diode 140, and a first transmission gate 145 connected in series, and the second transfer path 130 includes a second inductor 150, a second diode 155, and a second transmission gate 160 connected in series. The first transmission gate 145 and the second transmission gate 160 may each comprise a field effect transistors (FET) or any other suitable switch that is capable of selectively opening and closing the respective first transfer path 125 and second transfer path 130. The first diode 140 restricts power transfer in the first transfer path 125 to a first direction, i.e., from the first load capacitance 115 toward the second load capacitance 120. Conversely, the second diode 155 restricts power transfer in the second transfer path 125 in a second direction opposite the first direction, i.e., from the second load capacitance 120 toward the first load capacitance 115.

Still referring to FIG. 3, the first transmission gate 145 is controlled by the first clock signal C0 associated with first clock driver 105 such that the first transmission gate 145 is closed (e.g., completes the first transfer path 125) when the first clock signal C0 goes high and is opened when the first clock signal C0 goes low. Similarly, the second transmission gate 160 is controlled by the second clock signal C180 associated with the second clock driver 110 such that the second transmission gate 160 is closed when the second clock signal C180 goes high and is opened when the second clock signal C180 goes low.

In operation, the circuit 100 recycles power between the first load capacitance 115 and the second load capacitance 120 via the first transfer path 125 and the second transfer path 130. In particular, when the first clock signal C0 goes high and the second clock signal C180 goes low, the first transmission gate 145 closes and the second transmission gate 160 opens, which permits the power stored in the first load capacitance 115 to discharge (e.g., transfer) to the second load capacitance 120 via the first transfer path 125. Conversely, when the second clock signal C180 goes high and the first clock signal C0 goes low, the second transmission gate 160 closes and the first transmission gate 145 opens, which permits the power stored in the second load capacitance 120 to discharge (e.g., transfer) to the first load capacitance 115 via the second transfer path 130. The first diode 140 and the second diode 155 prevent backflow of power through the respective first transfer path 125 and second transfer path 130. This power recycling reduces the total power that must be provided by the first clock driver 105 and a second clock driver 110 to the driven devices (e.g., represented by the first load capacitance 115 and the second load capacitance 120).

Figure 4:
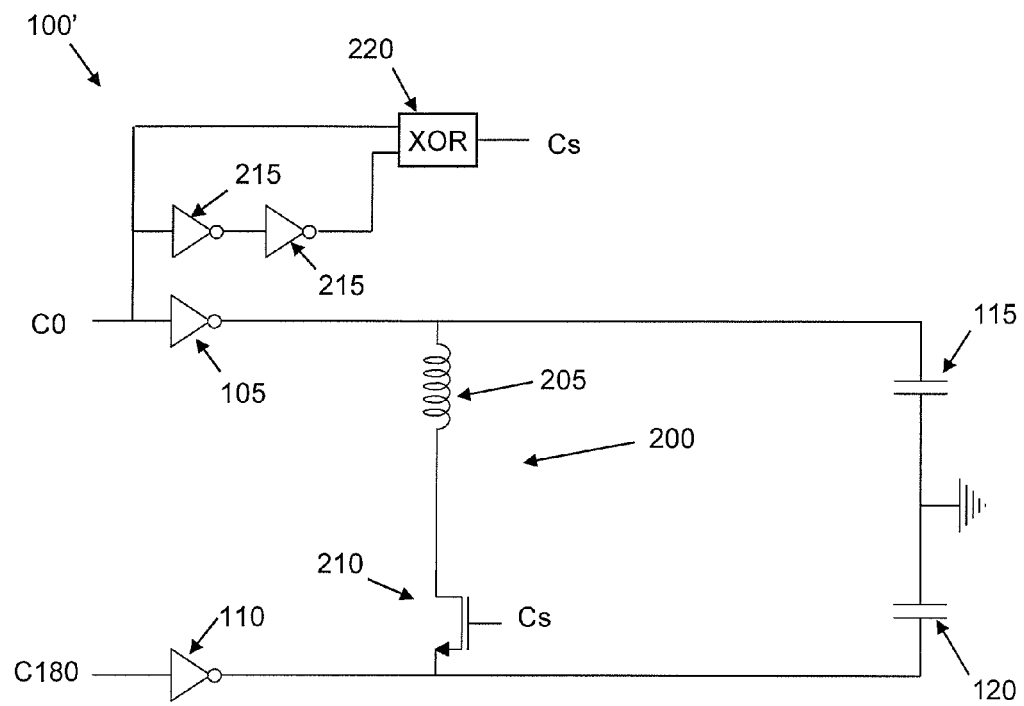
FIG. 4 shows a diagram of another circuit that provides resonant-power-transfer-assisted power reduction in differential clocking in accordance with aspects of the invention.
Figure 4:
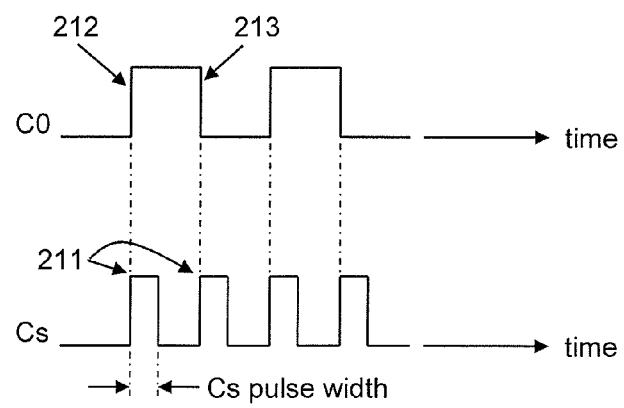

FIG. 4 shows a diagram of another circuit 100' that provides resonant-power-transfer-assisted power reduction in differential clocking according to aspects of the invention. In embodiments, the circuit 100' includes a first clock driver 105 having a first clock signal C0, a second clock driver 110 having a second clock signal C180, a first load capacitance 115, and a second load capacitance 120, all of which may be the same as described with respect to FIG. 3.

In accordance with aspects of the invention, the circuit 100' includes a single two-way transfer path 200 (e.g., a power transfer circuit) connected between the first load capacitance 115 and the second load capacitance 120, rather than two separate one-way transfer paths as described with respect to circuit 100 in FIG. 3. In embodiments, the transfer path 200 includes an inductor 205 and a transmission gate 210 that selectively permit power transfer from the first load capacitance 115 to the second load capacitance 120, and vice versa.

With continued reference to FIG. 4, the transmission gate 210 is controlled by a control signal "Cs" that is derived from the first clock signal C0. In embodiments, the circuit 100' is structured and arranged such that the control signal Cs is pulsed (shown at pulse 211) during the rising edge 212 of the first clock signal C0 and also during the falling edge 213 of the first clock signal C0. The pulsing of the control signal Cs is provided by a pulse generation circuit comprising a series of inverters 215 and an XOR logic element 220 that receive the first clock signal C0 as an input and are connected as shown in FIG. 4. In accordance with aspects of the invention, energy is transferred from the first load capacitance 115 to the second load capacitance 120 via the transfer path 200 when the control signal Cs pulses at the rising edge of the first clock signal C0. Conversely, energy is transferred from the second load capacitance 120 to the first load capacitance 115 via the transfer path 200 when the control signal Cs pulses at the falling edge of the first clock signal C0. In this manner, the control signal Cs and transmission gate 210 are used to control the timing and direction of energy transfer between the first load capacitance 115 and the second load capacitance 120 without using a diode.

In embodiments, the first clock driver 105 includes an inverter that is optimally sized to save power as it competes with the resonant path between the first load capacitance 115 and the second load capacitance 120. Too strong of an inverter diminishes the power savings provides by the power recycling, while too weak of an inverter reduces the slew rate and amplitude of the control signal Cs. In an exemplary implementation, the inverter of the clock driver 105 has a total width of about 1.0 mm and a channel length of about 40 nm, although the invention is not limited to these values and any suitable size inverter may be used.

Still referring to FIG. 4, the inductor 205 may be much smaller (e.g., an order of magnitude smaller) than an inductor used in a conventional LC-based resonant clock system. For example, the inductor 205 may be about 10 pH (picohenry), and the first load capacitance 115 and the second load capacitance 120 may each be about 100 pF (picofarad), although the invention is not limited to these values and any suitable sizes may be used.

In accordance with aspects of the invention, the width of the pulse 211 of the control signal Cs that drives the transmission gate 210 is controlled to be comparable to (e.g., correspond to) the rise time and fall time of the first clock signal C0. The width of the pulse is determined by the number and size of inverters 215, and is optimized to be sufficiently long to permit full discharge of the first load capacitance 115 and the second load capacitance 120 but no so long as to permit backflow after full discharge. In an exemplary embodiment, the pulse 211 of the control signal Cs has a width of about 45 ps (picoseconds) and the transmission gate 210 has a total width of about 1.8 mm and a channel length of about 40 nm, although other values may be used.

Moreover, because the control signal Cs is derived from the first clock signal C0, the width of the pulse 211 of the control signal Cs tracks the rise time and fall time of the first clock signal across process variations. For example, when a process variation causes the first clock signal C0 to have a slightly longer than nominal rise time, the pulse width of the control signal Cs will also be slightly longer than its nominal value due to the pulse width being based on the clock signal. Conversely, when a process variation causes the first clock signal C0 to have a slightly shorter than nominal rise time, the pulse width of the control signal Cs will also be slightly shorter than its nominal value due to the pulse width being based on the clock signal.

Figure 5:
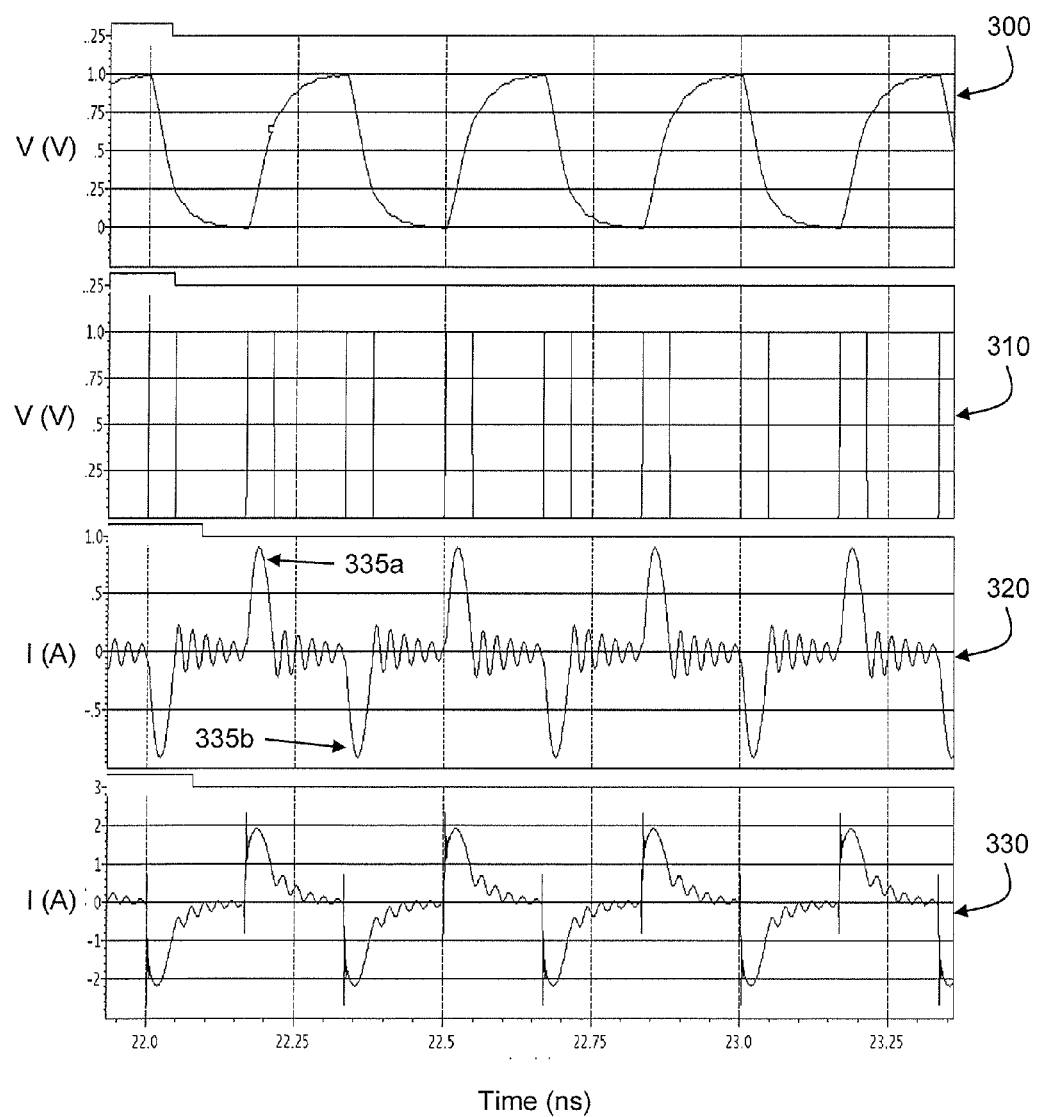
FIG. 5 shows simulation data at various nodes at the circuit of FIG. 4 in accordance with aspects of the invention.

FIG. 5 shows simulation data at various nodes of the circuit 100' of FIG. 4. Graph 300 shows the voltage of the output pulses at the first load capacitance 115 as a function of time. Graph 310 shows the voltage of the control signal Cs as a function of time. Graph 320 shows the current through the transfer path 200 as a function of time. And graph 330 shows the total load current (e.g., the sum of the current provided from the clock drivers and the transfer path) as a function of time. The highest amplitude peaks 335a and valleys 335b of the resonant path current shown in graph 320 coincide with the pulses of the control signal of graph 310 and represent the transfer of power between the first load capacitance 115 and the second load capacitance 120 when the transmission gate 210 is closed. These peaks 335a and valleys 335b represent power savings in that they contribute to the total load current of graph 330. With VDD set to 1 volt in the circuit 100', a power savings of about 24% to about 25% can be achieved over a wide frequency range of between 0.5 GHz and 4.0 GHz.

Figure 6:
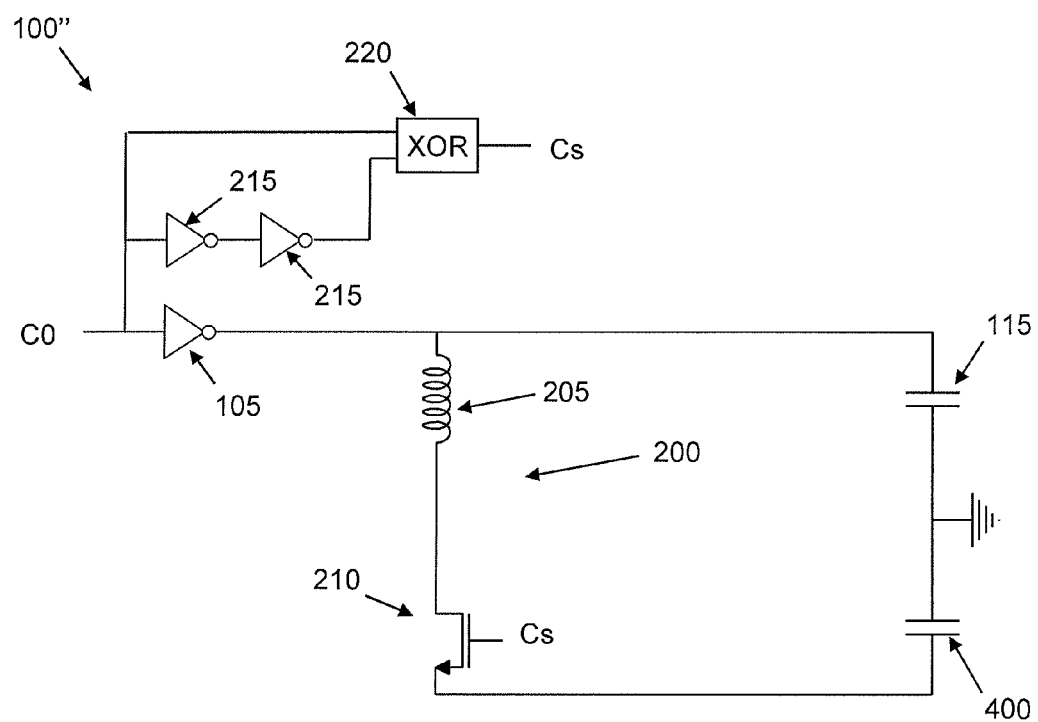
FIG. 6 shows a diagram of a circuit for a single-ended clock distribution in accordance with aspects of the invention.

FIG. 6 shows a diagram of a circuit 100" for a single-ended clock distribution in accordance with aspects of the invention. In embodiments, the circuit 100" includes a clock driver 105, a load capacitance 115, a transfer path 200 including an inductor 205 and a transmission gate 210, inverters 215, and XOR logic 220, all of which may be similar to like-numbered elements as described with respect to FIG. 4. The circuit 100" is directed to a single-ended clock distribution instead of a differential clock and thus does not include a second clock driver that is out of phase with the clock driver 105. Moreover, instead of having a second load capacitance associated with a second clock driver, the circuit 100" includes a dummy load capacitance 400 that temporarily stores and recycles energy for the load capacitance 115. In embodiments, the dummy load capacitance 400 comprises one or more devices that are structured and arranged to provide a capacitance similar to that of the load capacitance 115.

In operation, the circuit 100" generates a pulsed control signal Cs based on the signal of the clock driver 105, e.g., in a manner similar to that described with respect to circuit 100' of FIG. 4. The pulses of the control signal Cs close the transmission gate 210, which permits power transfer from the load capacitance 115 to the dummy load capacitance 400, and vice versa. The power savings provided by the circuit 100" are generally insensitive to the size of the dummy load capacitance 400, and power reductions of about 18% can be achieved using the circuit 100".

Implementations of the invention as described herein are thus capable of providing a signal driving circuit comprising: an input signal; an output signal having a capacitive load; a buffer circuit coupled between the input signal and the output signal to drive the capacitive load (e.g., load capacitance) between a plurality of voltage states (e.g., two voltage states); a dummy capacitive load (e.g., load capacitance); an inductor for temporarily storing energy from the first capacitive load; and a control circuit for controlling the flow of energy between the inductor and the capacitive load. The dummy capacitive load may mirror the capacitive load. The control circuit may comprise a switch in series with the inductor and a pulse generation circuit. The pulse generation circuit may be configured to create a pulse at each change of the output signal. The pulse generation circuit may comprise a delay and an exclusive-OR (XOR) logic. The pulse generation circuit pulse may have a duration that is much less than the period of the output signal. The control circuit may comprise a switch and a diode in series with the inductor. The output signal may be differential and the dummy load may be replaced by a second capacitive load that is driven by the opposite phase of the output signal from the first capacitive load.

Implementations of the invention as described herein may also be used to provide a method for optimizing the power in a signal driving circuit comprising the steps of: initially sizing a buffer to create minimally acceptable signal characteristics, e.g., slew rate and amplitude at the load; adding a resonant structure comprising a switch, a switch control circuit, and a small value inductor to the signal driving circuit; setting the switch size to a multiple (e.g., 2) of the buffer size; adjusting the characteristics (e.g., pulse width) of the switch control circuit to give minimum power level; adjusting the inductance of the inductor to give a further minimum power level; and adjusting the size of the switch to further reduce the power level. The method may include repeating the adjustments until a minimum power level is reached.

Figure 7:
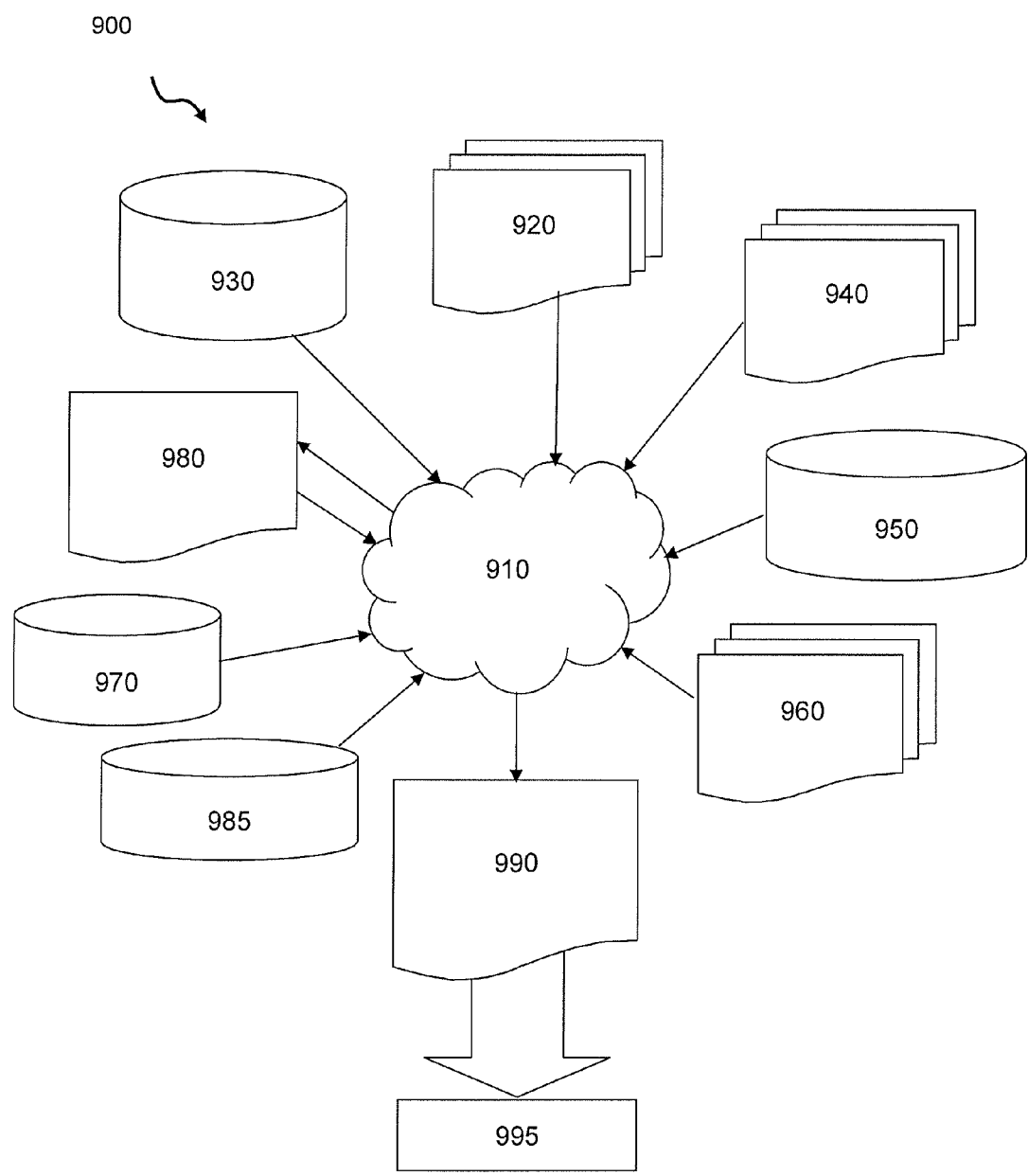
FIG. 7 is a flow diagram of a design process used in semiconductor design, manufacture, and/or test.

FIG. 7 is a flow diagram of a design process used in semiconductor design, manufacture, and/or test. FIG. 7 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 2-4 and 6. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 2-4 and 6. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 2-4 and 6 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-4 and 6. In one embodiment, design structure 990 may comprise a compiled, executable HDL simulation model that functionally simulates the devices shown in FIGS. 2-4 and 6.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-4 and 6. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit for recycling energy in a clock distribution network, comprising:
    a clock driver associated with a clock signal and having an output connected to a first load capacitance;
    a second load capacitance connected in parallel with the first load capacitance;
    a power transfer circuit comprising an inductor and a transmission gate connected in series between the first load capacitance and the second load capacitance, wherein the power transfer circuit controls a flow of energy between the first load capacitance and the second load capacitance based on the clock signal; and
    an XOR logic element, wherein the clock signal is a first input of the XOR logic element, and an output of the XOR logic element is a control signal for the transmission gate.

2. The circuit of claim 1, wherein the transmission gate is opened and closed by the control signal that is derived from the clock signal.

3. The circuit of claim 2, wherein a width of a pulse of the control signal corresponds to a rise time and fall time of the clock signal.

4. The circuit of claim 2, wherein a width of a pulse of the control signal tracks a rise time and fall time of the clock signal across process variations.

5. The circuit of claim 2, wherein
    the clock signal delayed by a series of buffers is a second input of the XOR logic element.

6. The circuit of claim 2, wherein
    the transmission gate comprise a transistor.

7. The circuit of claim 1, wherein:
    the power transfer circuit permits discharge of energy from the first load capacitance to the second load capacitance when the clock signal is in a first state; and
    the power transfer circuit permits discharge of energy from the second load capacitance to the first load capacitance when the clock signal is in a second state that is different from the first state.

8. The circuit of claim 1, wherein the first load capacitance comprises a plurality of devices that are driven by the clock driver.

9. The circuit of claim 8, wherein the plurality of devices are clocking devices in a clock distribution network.

10. The circuit of claim 1, wherein the second load capacitance is a dummy load capacitance.

11. The circuit of claim 1, further comprising a second clock driver, wherein:
    the clock driver comprises a first clock driver;
    the first load capacitance comprises a plurality of devices that are driven by the first clock driver; and
    the second load capacitance comprises a plurality of devices that are driven by the second clock driver.

12. The circuit of claim 11, wherein:
    the clock signal is a first clock signal; and
    the second clock driver is associated with a second clock signal that is out of phase relative to the first clock signal.

13. The circuit of claim 1, wherein the power transfer circuit recycles energy between the first load capacitance and the second load capacitance.

14. A circuit for recycling energy in a clock distribution network, comprising:
    a first clock driver associated with a first clock signal;
    a second clock driver associated with a second clock signal;

a first load capacitance comprising first elements that are driven by the first clock driver;

a second load capacitance comprising second elements that are driven by the second clock driver; and a power transfer circuit that transfers energy from the first load capacitance to the second load capacitance when the first clock signal is in a first state, and that transfers energy from the second load capacitance to the first load capacitance when the first clock signal is in a second state, wherein the power transfer circuit comprises: a first inductor in a first path between the first load capacitance and the second load capacitance, and a second inductor in a second path between the first load capacitance and the second load capacitance.

15. The circuit of claim 14, wherein the power transfer circuit comprises the first inductor and a transmission gate connected in series between the first load capacitance and the second load capacitance.

16. The circuit of claim 14, wherein the power transfer circuit comprises:

the first inductor, a first transmission gate, and a first diode connected in series in the first path between the first load capacitance and the second load capacitance; and the second inductor, a second transmission gate, and a second diode connected in series in the second path between the first load capacitance and the second load capacitance.

17. The circuit of claim 16, wherein the first diode and the second diode permit energy transfer in opposite directions between the first load capacitance and the second load capacitance.

18. A method of recycling energy in a clock distribution network, comprising:

providing a clock signal to a clock distribution network; and controlling a transfer of energy between a first load capacitance in the clock distribution network to a second load capacitance in the clock distribution network based on a state of the clock signal, wherein the controlling comprises: transferring energy via a first transfer path comprising a first diode and a first inductor when the clock signal is in a first state, and transferring energy via a second transfer path comprising a second diode and a second inductor when the clock signal is in a second state.

19. The method of claim 18, wherein the controlling comprises:

transferring energy from the first load capacitance to the second load capacitance when the clock signal is in the first state; and transferring energy from the second load capacitance to the first load capacitance when the clock signal is in the second state different from the first state.

20. The method of claim 19, wherein the controlling comprises:

generating a control signal based on the clock signal; and opening and closing a transmission gate based on the control signal.

21. The method of claim 20, wherein:

the transmission gate is connected in series with the first inductor between the first load capacitance and the second load capacitance.

22. The method of claim 19, wherein the controlling comprises:

closing a first transmission gate in the first transfer path and opening a second transmission gate in the second transfer path when the clock signal is in the first state; and opening the first transmission gate in the first transfer path and closing the second transmission gate in the second transfer path when the clock signal is in the second state.

23. The method of claim 22, wherein:

the first transfer path comprises the first transmission gate, the first diode, and the first inductor connected in series between the first load capacitance and the second load capacitance; and the second transfer path comprises the second transmission gate, the second diode, and the second inductor connected in series between the first load capacitance and the second load capacitance.

* * * * *